March 16, 1965    W. C. VAN'T SANT    3,173,972

CONTACTING TRAY WITH VARIABLE PASSAGE

Filed Aug. 22, 1961

INVENTOR:
WILLEM C. VAN'T SANT

BY: *Oswald H. Wilmore*

HIS ATTORNEY

United States Patent Office 3,173,972
Patented Mar. 16, 1965

3,173,972
CONTACTING TRAY WITH VARIABLE
PASSAGE
Willem C. Van't Sant, The Hague, Netherlands, assignor to Shell Oil Company, New York, N.Y., a corporation of Delaware
Filed Aug. 22, 1961, Ser. No. 133,240
Claims priority, application Netherlands, Sept. 30, 1960, 256,429
5 Claims. (Cl. 261—114)

The invention relates to contacting trays, sometimes called bubble trays, suitable for installation in a contacting column for effecting exchange between ascending gas and descending liquid, e.g., for distillation, absorption, or the like. The term "gas" is used herein to include vapor.

More particularly, the invention is concerned with contacting trays having variable gas passages, wherein the gas passages are controlled by valve bodies which are positioned over the passages through the trays and are supported in their lowest positions by the upper tray surface, wherein each valve body has a guide member consisting of elements projecting downward through the passage and distributed over the periphery, the ends of which elements are provided with a stop impinging on the bottom of the tray when the valve is lifted.

Trays of this type are known, for instance, from the Belgian patent specification 588,502.

The elements which together form the guide member may consist of metal strips welded to the valve body. These elements may also be integral with the valve body, as in the constructions described in the said Belgian patent specification. In this instance the valve body is stamped out of a plate together with the said elements, which are then bent downwards. The said elements may be stamped out of the inner part of the valve body, thereby providing the valve body with an opening, so that the body cannot fully close the passage. There are, however, also constructions in which the said elements, before being bent downward, extend radially outwards from the valve body so that no opening is formed therein.

In the latter case a fairly large amount of structural material is used to form the body, which is uneconomic. If use is made of guide elements stamped out of the valve body, as shown in the said Belgian patent specification, an additional cover plate should be provided if it is desired to obtain a fully closed valve body. However, it is usually desired to maintain openings in the valve body, ensuring a minimum free passage through the tray at all times. An opening obtained by stamping the guide members out of the valve body is not always attractive as the size of such an opening is always determined by the dimensions of the guide members and the number thereof.

Moreover owing to the small size of the valve body the length of the guide members cannot be freely selected. Elements welded to the valve body do not cause the above complications although, on the other hand, an additional operation, namely welding, is required.

The object of the invention is to provide a bubble tray construction having a number of advantages as compared with the known constructions, as will be explained hereinafter.

The invention comprises a contacting tray of the type previously indicated, characterized in that the guide elements consist of resilient material in the form of a wire and are fastened to the valve body by bending.

The advantages of this valve construction are as follows:

The valve is considerably cheaper than the valves hitherto known.

When one or more of the guide members are damaged they can be replaced in a simple way.

There is no additional loss of sheet metal from which the valve bodies are manufactured.

The valve body itself may remain entirely intact and if it is desired to provide one or more openings therein, there is full freedom in the choice of the shape and size thereof.

No laborious manipulation such as welding is required for securing the elements to the valve body.

It is possible to emplace the valve body on the tray from the top only; in other words, no other man is required on the lower side to secure the valve, as is necessary with the known valves, in which at least some of the flexible guide members must be bent straight after the valve has been placed in position. The valve according to the invention, however, clicks into position in the tray passage owing to the resilient properties of the elements.

The guide elements preferably consist of resilient steel wire and may, according to the invention, be secured to the valve body by fastening one or more of such wires into positioning recesses in the valve body. A part of each guide element is situated on the top of the valve body and one or both ends extend to the lower side of the valve body via the recesses and thence vertically near the periphery of the valve body in order to guide the valve by engagement with the edge of the tray opening. The final section of each of said wire end or ends is doubled back outwardly to form a stop engageable with the underside of the tray.

The recesses are preferably formed by incisions made on or near the periphery of the valve body. In the preferred construction the valve material is bent downwards at the locus of the recesses so as to form supporting projections or lips by which the valve, when lowered, can rest on the tray surface. The presence of these projections enables the valve, when in its lowest position, to contact the tray only at separated points, thereby obviating the risk of the valve body's adhering to the tray. Another advantage is that also in the lowest position a minimum opening of the valve is maintained along the edge thereof. In this way the tray has a fixed minimum value for the variable tray passage, the advantage being that with low vapor loads a higher tray output is attained than when the valves are capable of completely closing the tray passages. It is thereby no longer necessary to provide additional openings in the valve bodies. Of course, such additional openings may be used but very small openings will suffice, permitting a favorable distribution of the gas stream. In addition, the presence of a minimum opening of the valve makes it easier to lift up when the load increases.

The center of the valve body may be provided with an opening for fastening those ends of the members which are not extended for guiding purposes.

The invention will now be further illustrated with reference to the accompanying drawing forming a part of this specification and showing several preferred embodiments, wherein.

Figure 1:
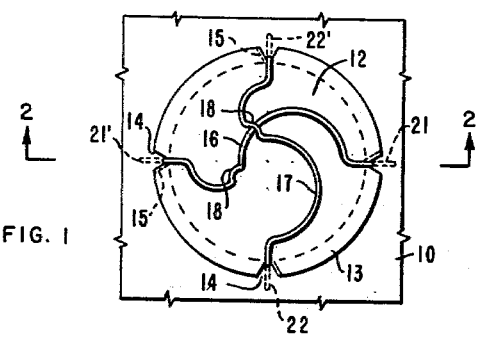
FIGURE 1 is a top plan view of a valve according to the invention and a portion of a tray.
Figure 2:
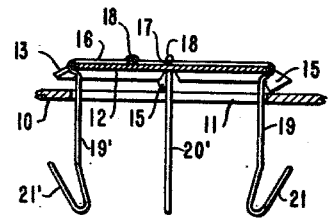
FIGURE 2 is a sectional view, taken on the line 2—2 of FIGURE 1.

Referring to FIGURES 1 and 2, 10 represents a part of a contacting tray having a plurality of gas passages 11, only one of which appears. It will be understood that several of such trays are mounted in vertically spaced relation within a contacting column to accumulate bodies of liquid which descends in known manner from tray to tray, e.g., via downcomers or through the gas passages. Each gas passage has a vertically movable valve body 12, e.g., made of imperforate sheet metal, which preferably has its edge bent downward to provide a frusto-conical rim 13. Four recesses or notches 14 are formed in the rim 13 at equal circumferential intervals by making cuts at an angle to the radial plane and bending the metal downward at one side to provide support projections or lips 15 which extend below the rim. These projections are situated outwardly from the edge of the gas passage to engage the top surface of the tray as shown in FIGURE 2, leaving the bottom of the rim spaced slightly from said surface.

Each valve body has a plurality of guide members formed, in this embodiment, by a pair of resilient steel springs 16, 17, which have their upper, central portions in substantially continuous engagement with the flat top of the valve body and are advantageously of undulating shape as shown to oppose rotation of the springs and to promote resiliency. Each said central portion has a small kink 18 to accommodate another spring, it being evident that only the kink in the spring 17 serves this function, that in the spring 16 being provided merely to permit these springs to be of identical construction. Each of these springs has both ends 19, 19' or 20' extended downwards through one of the recesses 14, each spring being positioned in diametrically opposed recesses and curved inwardly immediately under the body as shown in FIGURE 2. (One end of the spring 17, corresponding to 20', does not appear in the drawing, being situated in front of the plane of FIGURE 2.) The springs act in tension between the radially opposed recesses to clamp the valve body. The said end portions extend thence downwardly spaced inwardly from but in close proximity to the edge of the passage 11 to constitute four guiding sections. The terminal sections 21, 21' or 22, 22' of these ends are doubled back outwardly and upwardly to form stops which engage the under side of the tray 10 when the valve body is lifted to its uppermost position.

The valves can be emplaced in the tray in a simple manner. The assembled valve body is simply forced downwards through the passage 11 from the top of the tray. The guiding sections are deflected radially inwardly when the stop sections 21–21' engage the tray until they are fully below the tray, whereupon they move resiliently back to or substantially to the positions shown.

Figure 3:
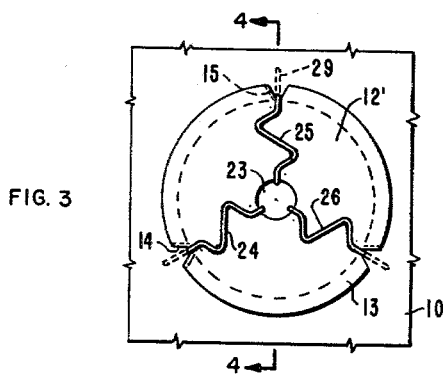
FIGURES 3 and 4 are, respectively, a plan and a sectional view taken on the line 4—4 of FIGURE 3, of a modified construction of the valve body.
Figure 4:
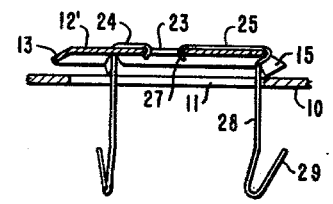

In the embodiment shown in FIGURES 3 and 4 the valve body 12' has a small central hole 23 and only three recesses 14. Three springs 24, 25 and 26 are provided. Each spring has a sinuous section lying continuously on the flat upper surface of the valve body and one end thereof bent down into the central hole to form a retaining hook 27. The other end of each spring extends downwards through one of the recesses 14 and is bent inwards a small distance under the body at the recess, as shown, to secure the spring to the body. Each spring extends thence vertically downward to form a guiding section 28 and the terminal section thereof is doubled back to form a stop 29. Only the springs 24 and 25 appear in FIGURE 4, the third being of like construction. It is evident that the number of springs and recesses used in this embodiment may be varied. The upper sinuous portions of the springs afford improved resiliency so that each spring acts in tension between its hook 27 and the part which engages the peripheral recess for effecting a clamping action; also, this shape opposes rotation of the spring about the axis joining the hook and the said engaging part, thereby maintaining the guiding section vertical. Reference numbers not mentioned denote parts described for the previous embodiment.

Figure 5:
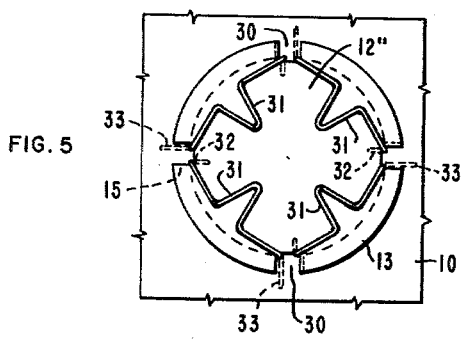
FIGURES 5–8 are plan views of four other modified constructions of the valve body and portions of trays.

In the embodiment of FIGURE 5 the valve body 12" also has an inclined rim 13 but the four recesses are rectangular in shape to provide corners. Four identical springs 31 are used, each having a zig-zag shaped outline in continuous engagement with the flat upper surface of the valve body and spanning a pair of adjacent recesses in tension. One end of each spring has a hook 32 and the other is bent slightly under the valve body for securement before extending downwards to form the guiding section. The terminal section of each latter end is doubled back to provide a stop 33, shaped as previously described for the stops 21–22'. It is evident that the spring is secured at the near corners of the recesses and that any other outline for the recess which will provide such attachment niches may be used; and that the zig-zag shape of the top part of each spring insures resilient engagement with the spring in tension between said corners and further stabilizes the spring against rotation about the axis joining those corners.

Figure 6:
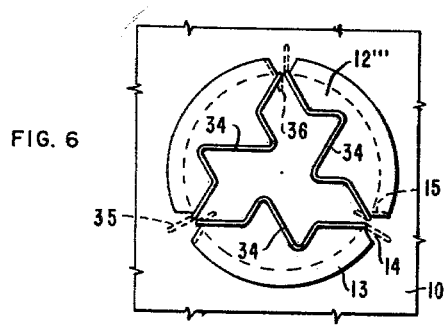

In the embodiment according to FIGURE 6 the valve body 12''' has a rim 13 and three notches 14 and is provided with three identical springs 34. Each spring spans a pair of adjacent recesses and is clamped thereto in the manner described for FIGURE 5. Again, the upper part of each spring is irregular in outline and only one end of each spring is extended downwardly to form a vertical guiding section and a stop 35, the other end being formed as a hook 36. The springs are placed to form a triangular pattern and, as in the previous embodiment, do not cross each other.

Figure 7:
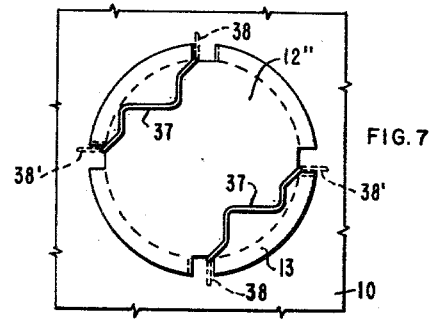

In the embodiment according to FIGURE 7, in which the valve body 12" is identical to that of FIGURE 5, two identical springs 37 are used, each spanning a pair of adjacent recesses and clamped to the valve body as previously described, with the difference that both ends of each spring extend vertically downwards to form guiding sections and stops 38, 38'.

Figure 8:
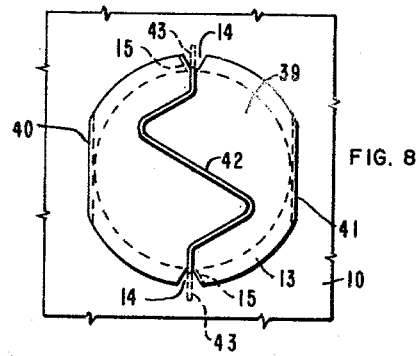

In FIGURE 8 the valve body 39 again has a rim 13 but is provided with only two notches 14 at diametrically opposed points. To prevent tilting motion about the projections 15 at these notches the rim 13 is bent downward at 40 and 41, at points approximately 90° distant from the recesses. In this embodiment only a single spring 42 is used. It has both ends extended vertically to provide guiding sections and stops 43 and its upper part is shaped sinuously and clamped to the valve body as previously described.

The embodiments described are attractive in that the springs, when more than one is used, can be formed to identical shapes for any one embodiment.

An additional advantage is that the valves can also be used with trays having bubble caps, for instance, when a bubble cap is damaged and ceases to operate. Such a bubble cap can then be replaced temporarily by a valve of the type described above, which can be emplaced in a simple manner in the riser opening of the tray.

I claim as my invention:

1. A gas-liquid contacting apparatus comprising: a contacting tray adapted to be mounted horizontally within a contacting column to retain a body of liquid thereon and having a flow opening therethrough, and a valve mounted on said tray for vertical movement between a lower and an upper position to control the passage through the said opening, said valve comprising a valve body situated above the tray, at least a part of said body being engageable with the upper tray surface for support when the valve is in its lowest position, said body having peripheral recesses therein, and at least one resilient spring separate from said valve body including a top portion situated above the body and guide members extending down through said recesses and thence downwardly through said tray opening near the edge thereof for vertical movement together with the body relative to the tray, said spring being secured to the body by resilient clamping engagement thereto at the ends of said top portion, the lower parts of said guide members providing stops which are situated in spaced relation beneath the tray when the valve is in said lowest position and extend laterally outwards from the guide members for engagement with the under side of the tray to limit upward movement of the valve.

2. Contacting apparatus as defined in claim 1 wherein the said stops are upwardly and outwardly inclined to present downwardly directed inclined surfaces for engagement with the edge of the tray opening when the composite valve is installed by downward movement through the opening.

3. Contacting apparatus as defined in claim 1 wherein said top portion of the spring is in engagement with the top surface of the valve body and has an undulating shape, thereby stabilizing the spring against rotation and improving resilient clamping.

4. Contacting apparatus as defined in claim 1 wherein said recesses are formed by incisions in the valve body situated near the periphery thereof, the part of the body adjacent each incision being bent downwards to form an extension situated outwardly of said opening and below the other parts of the valve body to support the latter in spaced relation to the tray.

5. Contacting apparatus as defined in claim 1 wherein said guide members are formed of a plurality of separate resilient springs of identical shape and size individually clamped to the valve body, each said spring forming at least one guide member.

References Cited by the Examiner
UNITED STATES PATENTS

| Number | Date | Name | Class |
|---|---|---|---|
| 1,057,576 | 4/13 | Mussell | 261—114 |
| 2,061,830 | 11/36 | Campbell | 261—114 |
| 2,443,812 | 6/48 | Ackroyd | 261—114 |
| 2,951,691 | 9/60 | Nutter | 261—114 |
| 3,080,155 | 3/63 | Glitsch et al. | 261—114 |

FOREIGN PATENTS

| 1,237,299 | 6/60 | France. |
|---|---|---|

OTHER REFERENCES

Petroleum Refiner (Glitsch), volume 39, No. 6, page 46, June 1960.

HARRY B. THORNTON, *Primary Examiner.*

HERBERT L. MARTIN, *Examiner.*